United States Patent
Nam et al.

(10) Patent No.: US 12,303,871 B2
(45) Date of Patent: May 20, 2025

(54) CATALYST FOR REMOVING SATURATED HYDROCARBON

(71) Applicants: HYUNDAI MOTOR COMPANY, Seoul (KR); KIA CORPORATION, Seoul (KR)

(72) Inventors: Yoon Sang Nam, Gunpo-si (KR); Hyokyung Lee, Anyang-si (KR); Seunghyo Noh, Uiwang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 768 days.

(21) Appl. No.: 17/517,840

(22) Filed: Nov. 3, 2021

(65) Prior Publication Data
US 2022/0347657 A1 Nov. 3, 2022

(30) Foreign Application Priority Data
Apr. 28, 2021 (KR) .................. 10-2021-0054736

(51) Int. Cl.
| | |
|---|---|
| *B01J 23/42* | (2006.01) |
| *B01D 53/94* | (2006.01) |
| *B01J 21/04* | (2006.01) |
| *B01J 37/02* | (2006.01) |
| *B01J 37/04* | (2006.01) |
| *F01N 3/28* | (2006.01) |

(52) U.S. Cl.
CPC ............ *B01J 23/42* (2013.01); *B01D 53/945* (2013.01); *B01J 21/04* (2013.01); *B01J 37/0201* (2013.01); *B01J 37/04* (2013.01); *F01N 3/2803* (2013.01); *B01D 2255/1021* (2013.01); *F01N 2370/02* (2013.01)

(58) Field of Classification Search
None
See application file for complete search history.

(56) References Cited

U.S. PATENT DOCUMENTS

| | | | |
|---|---|---|---|
| 6,083,868 A | 7/2000 | Takeru et al. | |
| 2011/0099987 A1* | 5/2011 | Satou | B01D 53/945 60/299 |

FOREIGN PATENT DOCUMENTS

EP 1470859 A1 10/2004

* cited by examiner

*Primary Examiner* — Jelitza M Perez
(74) *Attorney, Agent, or Firm* — MCDONNELL BOEHNEN HULBERT & BERGHOFF LLP

(57) ABSTRACT

Disclosed is a catalyst for removing saturated hydrocarbon including an acidic support including porous alumina ($Al_2O_3$) and having higher acidity than alumina, and an active metal including platinum (Pt) and supported on the acidic support.

5 Claims, 6 Drawing Sheets

CATALYST FOR REMOVING SATURATED HYDROCARBON

CROSS REFERENCE TO RELATED APPLICATIONS

This application claims priority to and the benefit of Korean Patent Application No. 10-2021-0054736 filed in the Korean Intellectual Property Office on Apr. 28, 2021, the entire contents of which are incorporated herein by reference.

BACKGROUND

(a) Field

The present disclosure relates to a catalyst for removing saturated hydrocarbons in exhaust gas of a lean burn engine.

(b) Description of the Related Art

In order to improve fuel efficiency of internal combustion engines, lean burn engines are being developed, but exhaust gas emitted from the lean burn engines has a low temperature and contains a large amount of hydrocarbons (HC). Accordingly, when a conventional noble metal catalyst including palladium (Pd)/rhodium (Rh) is applied thereto, a hydrocarbon purification rate thereof is rather deteriorated and may hardly satisfy emission regulations.

In addition, since a ratio of saturated hydrocarbon in a lean burn section relative to in an air-fuel ratio section 1 rapidly increases, as an oxygen concentration increases, purification performance of the saturated hydrocarbon of the exhaust purification catalyst is further deteriorated. The reason is that since the noble metals and oxygens (O) have larger adsorption energy than the hydrocarbon (HC) on the catalyst surface, the plurality of oxygens poison sites where the reaction may occur and thus deteriorate the purification rate of the hydrocarbon.

Accordingly, there are needs for an improved three-way catalyst capable of increasing the purification performance of the hydrocarbon in the lean burn section.

SUMMARY

The present disclosure provides a catalyst for removing saturated hydrocarbon having excellent purification performance of saturated hydrocarbons even when an oxygen concentration increases in a lean burn section in which a ratio of saturated hydrocarbons in exhaust gas rapidly increases.

According to an embodiment, a catalyst for removing saturated hydrocarbon includes an acidic support including porous alumina ($Al_2O_3$) and having higher acidity than alumina, and platinum (Pt) supported on the acidic support.

The acidic support may include an acidic material including Ti, Si, Zr, a metal oxide having higher acidity than alumina, or a combination thereof supported on the porous alumina.

The metal oxide having higher acidity than alumina may include $SiO_2$, $TiO_2$, $ZrO_2$, or a combination thereof.

The acidic material may be physically mixed, chemically bonded, or coated onto the porous alumina.

The acidic support may be a solid solution of porous alumina and an acidic material.

The acidic material may is in contact with or not in contact with the platinum.

The catalyst may have a relative oxygen binding energy based on the oxygen binding energy of Pd(111) of less than about −0.01 eV.

The active metal may further include palladium (Pd), rhodium (Rh), iridium (Ir), ruthenium (Ru), or a combination thereof.

The catalyst may be mounted on the exhaust gas stream from gasoline engines operating with an air-fuel ratio of greater than or equal to about 1.2.

The catalyst for removing saturated hydrocarbon of the present disclosure has excellent purification performance of saturated hydrocarbons even when an oxygen concentration increases in a lean burn section in which a ratio of saturated hydrocarbons in exhaust gas rapidly increases.

DETAILED DESCRIPTION

The advantages and features of the present disclosure and the methods for accomplishing the same will be apparent from the embodiments described hereinafter with reference to the accompanying drawings. However, an implemented form may not be limited to exemplary embodiments disclosed below. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined.

In addition, unless explicitly described to the contrary, the word "comprise", and variations such as "comprises" or "comprising," will be understood to imply the inclusion of stated elements but not the exclusion of any other elements.

Further, the singular includes the plural unless mentioned otherwise.

The catalyst for removing saturated hydrocarbon according to an embodiment includes an acidic support, and an active metal supported on the acidic support.

The catalyst according to an embodiment includes platinum (Pt) as an active metal. Platinum has excellent hydrocarbon purification performance compared to noble metals such as palladium (Pd) or rhodium (Rh) in the lean section.

However, in the Lean section, the ratio of saturated hydrocarbon compared to the air-fuel ratio section 1 increases rapidly, and the purification performance of saturated hydrocarbon of the exhaust purification catalyst using platinum may further deteriorate as the oxygen concentration increases. This is because, on the catalyst surface, the Pt—O adsorption energy is greater than that of Pt—HC, so sites that can react by a large number of oxygen may be poisoned, and the purification rate of hydrocarbons may be lowered.

In order to improve this, in the catalyst according to an embodiment, platinum is supported on an acidic support. Accordingly, it is possible to increase the purification rate of hydrocarbon by reducing the binding force between Pt—O.

Figure 1:
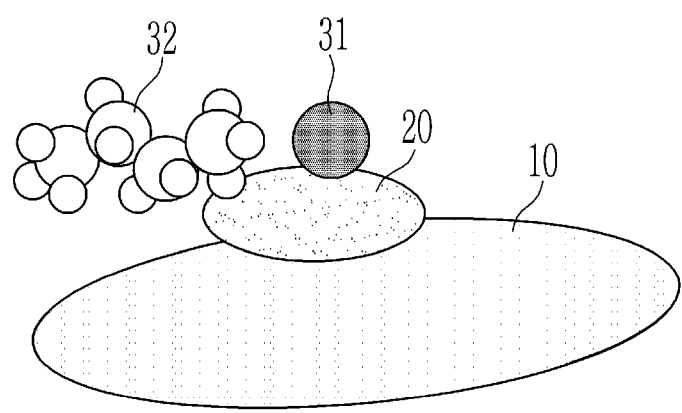
FIG. 1 is a schematic view showing a catalyst according to an embodiment.
Figure 2:
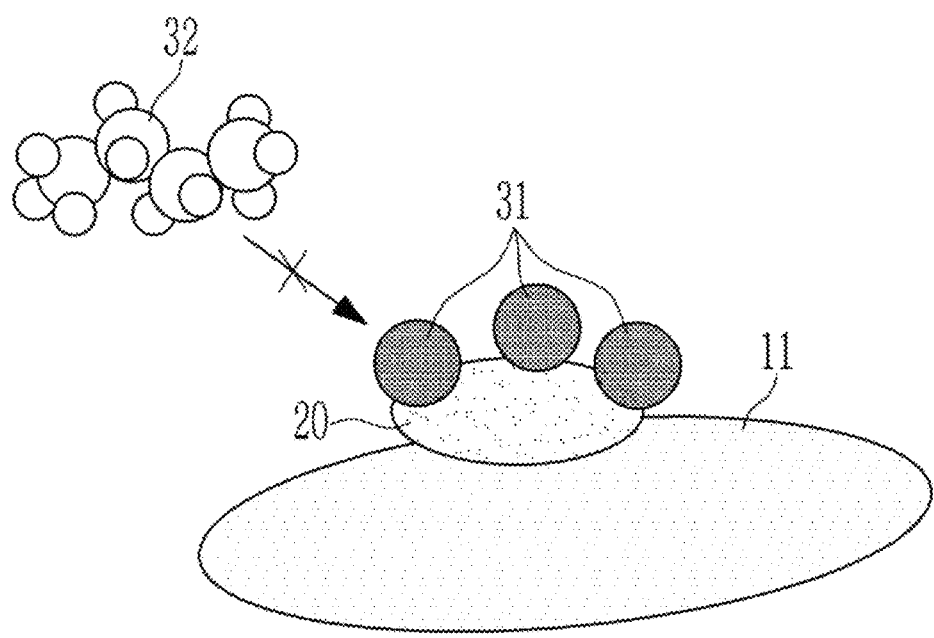
FIG. 2 is a schematic view showing a catalyst according to the prior art.

FIG. 1 is a schematic view showing a catalyst according to an embodiment and FIG. 2 is a schematic view showing a catalyst according to the prior art.

Referring to FIG. 1, as the platinum 20 is supported on the acidic support 10, the binding force between the platinum 20 and the oxygen 31 may be reduced, so that sites on which the hydrocarbon 32 can react may be secured. Referring to FIG. 2, when a general porous alumina support 11 is used, the adsorption energy of platinum 20 and oxygen 31 on the surface of platinum 20 is greater than the adsorption energy of platinum 20 and hydrocarbon 32, sites on which a reaction can occur by a plurality of oxygen 31 may be poisoned, and thus the purification rate of the hydrocarbon 32 may be reduced.

The acidic support includes porous alumina ($Al_2O_3$), and may have higher acidity than alumina.

Since the acidic support includes an acidic material supported on porous alumina, it may have a higher acidity than alumina. For example, the acidic material may include Ti, Si, Zr, a metal oxide having higher acidity than alumina, or a combination thereof. For example, the metal oxide having higher acidity than alumina may include $SiO_2$, $TiO_2$, $ZrO_2$, or a combination thereof.

A weight ratio of the porous alumina and the acidic material may be about 99:1 to about 30:70. When the weight ratio of the acidic material is less than about 1, performance improvement may be insignificant, and when it exceeds about 70, high temperature heat resistance may be deteriorated.

Figure 3:
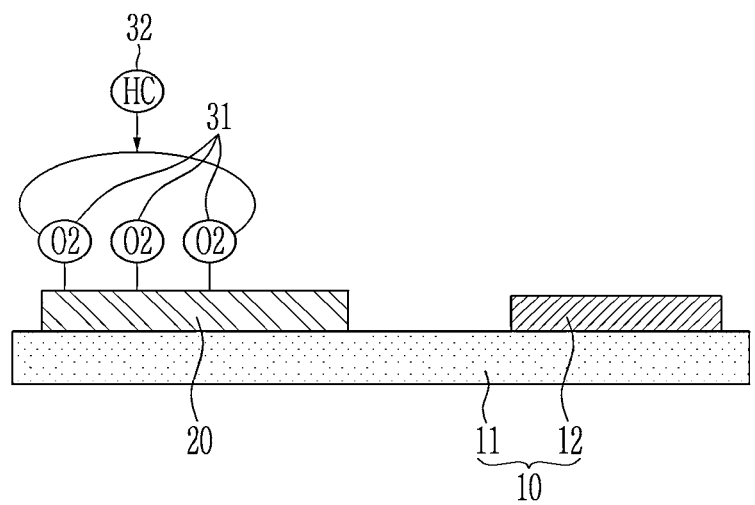
FIGS. 3, 4, and 5 are schematic views showing examples of the arrangement of platinum, an acidic material, and porous alumina in a catalyst according to an embodiment.
Figure 4:
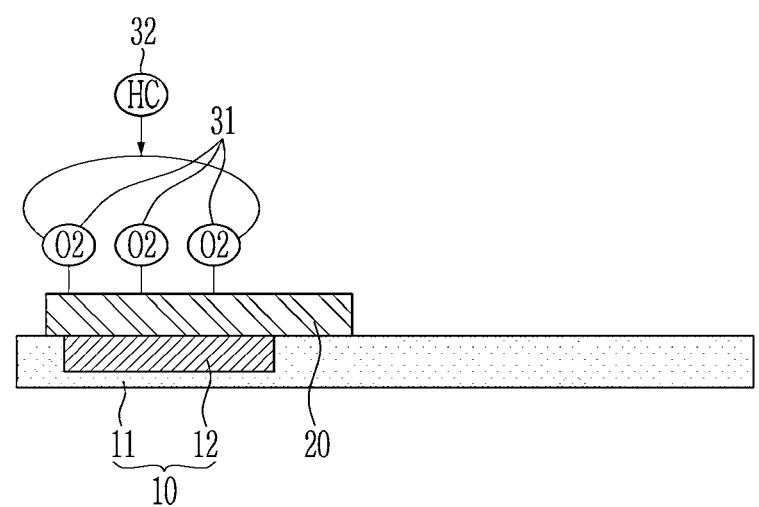
Figure 5:
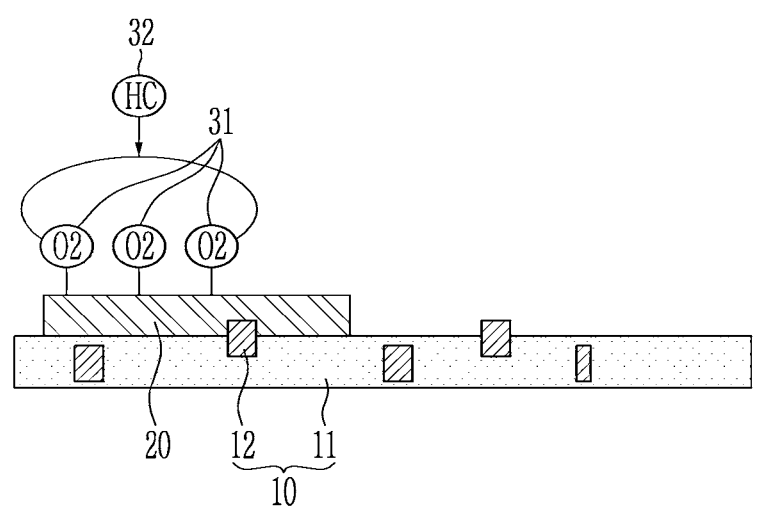

FIGS. 3 to 5 are schematic views showing examples of the arrangement of platinum, an acidic material, and porous alumina.

As shown in FIGS. 3 and 4, the acidic material 12 may be physically mixed, chemically bonded, or coated onto the porous alumina 11, and as shown in FIG. 5, the acidic support 10 may be a solid solution of the porous alumina 11 and the acidic material 12.

In addition, as shown in FIG. 3, the acidic material 12 may not be in contact with the platinum 20 and is disposed independently, or as shown in FIG. 4, the acidic material 12 may not be in contact with the platinum 20.

The active metal may further include additional metals including palladium (Pd), rhodium (Rh), iridium (Ir), ruthenium (Ru), or a combination thereof, along with platinum. When the active metal further includes an additional metal such as palladium, it is possible to obtain an effect of improving high temperature durability (900° C. or greater).

The catalyst may include about 25 wt % to about 99 wt % of platinum and/or additional metals based on the total weight of the catalyst. If the amount of platinum and/or additional metal is less than about 25 wt %, high temperature durability (900° C. or greater) may be reduced, and if it exceeds about 99 wt %, performance improvement may be insignificant.

In the catalyst according to an embodiment, as platinum is supported on the acidic support, the binding force between Pt—O is reduced. For example, the relative oxygen binding energy of the catalyst based on the oxygen binding energy of Pd(111) may be less than about −0.01 eV, for example, about −0.01 eV to about −0.30 eV.

The oxygen binding energy may be calculated by Equation 1, and the relative oxygen binding energy may be calculated by Equation 2.

$$E_{b(cat\text{-}sup)} = -(E_{(O\text{-}cat)} - E_{(cat)} - E_{(O)})$$ Equation 1:

In Equation 1, $E_{(O\text{-}cat)}$ is the ground state energy of the catalyst-oxygen adsorption structure, $E_{(cat)}$ is the ground state energy of the catalyst, and $E_{(O)}$ is the ground state energy of oxygen.

$$E_{b\_rel} = -(E_{b(cat\text{-}sup)} - E_{b(Pd111)})$$ Equation 2:

In Equation 1, $E_{b(Pd111)}$ is the oxygen binding energy of the Pd (111) plane.

As an example, the binding energy may be calculated using density functional theory (DFT) assuming that 10 wt % of an acidic material is disposed in a solid solution form on the porous alumina ($Al_2O_3$).

Accordingly, the catalyst according to an embodiment is mounted on the exhaust gas stream discharged from a gasoline engine operating with an air-fuel ratio of greater than or equal to about 1.2, and the ratio of saturated hydrocarbons is rapidly increased, and saturated hydrocarbons in exhaust gas with high oxygen concentration may be purified with improved efficiency.

For example, the saturated hydrocarbons discharged from the lean burn section may include 2-methylbutane, ethane, 2,2,4-trimethylpentane, butane, pentane, 2-methylpentane, methane, n-heptane, n-hexane, propane, or a combination thereof.

Hereinafter, specific examples of the disclosure are described. However, the examples described below are for illustrative purposes only, and the scope of the disclosure is not limited thereto.

EXAMPLE: PREPARATION OF CATALYST FOR REMOVING SATURATED HYDROCARBON

Example 1

A Pt/Si—$Al_2O_3$ catalyst was prepared by supporting Pt on an Si—$Al_2O_3$ acidic support, in which Si was supported on $Al_2O_3$(Siralox, Sasol Ltd.), by wet impregnation.

Example 2

A Pt/Ti—$Al_2O_3$ catalyst was prepared by supporting Pt on an Si—$Al_2O_3$ acidic support, in which Ti was supported on $Al_2O_3$(Siralox, Sasol Ltd.), by wet impregnation.

Example 3

A Pt/Si+Ti—$Al_2O_3$ catalyst was prepared by supporting Pt on an Si—$Al_2O_3$ acidic support, in which Si and Ti were supported on $Al_2O_3$(Siralox, Sasol Ltd.), by wet impregnation.

Comparative Example 1

A Pd/$Al_2O_3$ catalyst was prepared by supporting Pd on an $Al_2O_3$ support by wet impregnation.

Comparative Example 2

A Pt/$Al_2O_3$ catalyst was prepared by supporting Pt on an $Al_2O_3$ support by wet impregnation.

Experimental Example 1: Relative Oxygen Binding Energy of Catalyst

Figure 6:
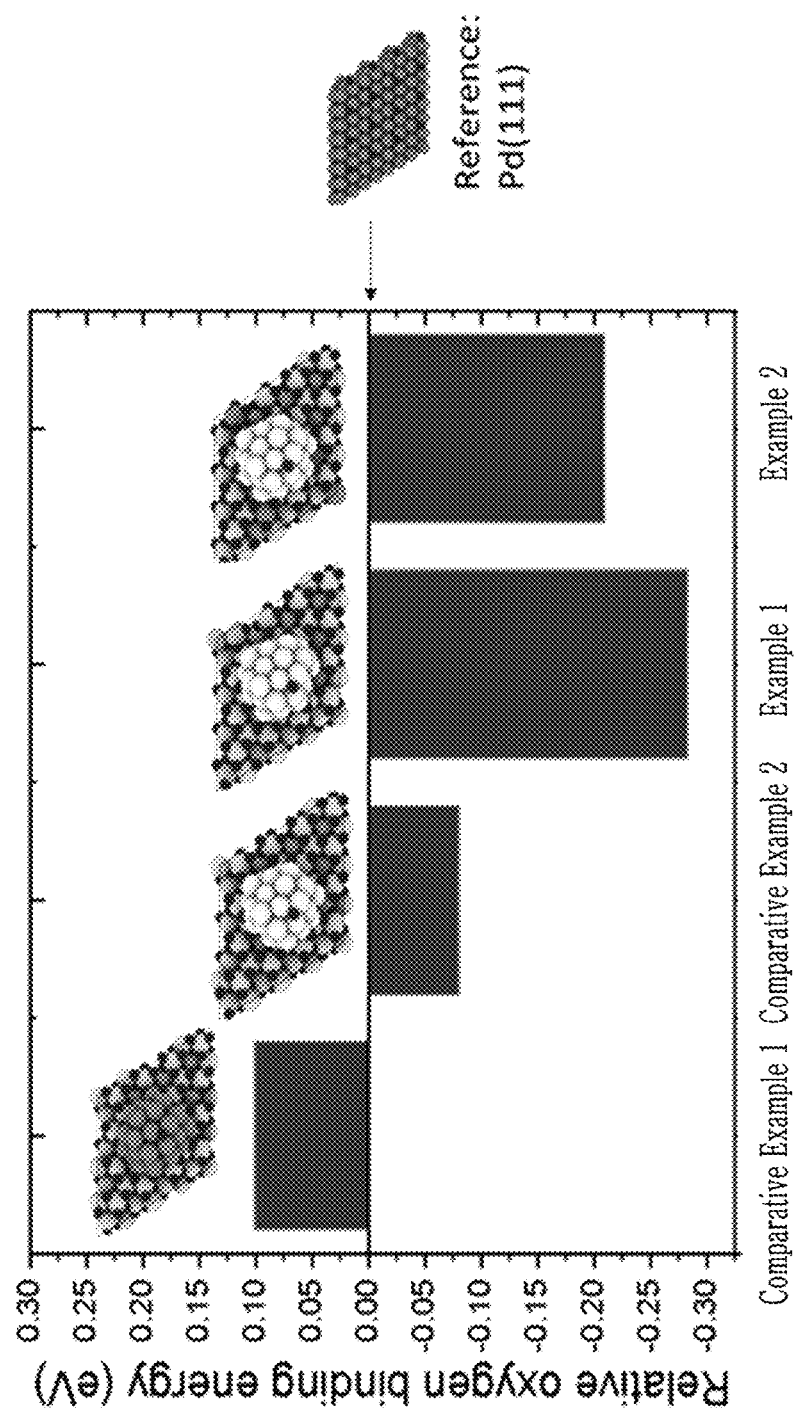
FIG. 6 is a graph showing the results of measuring the relative oxygen binding energy of the catalysts prepared in examples and comparative examples.

The catalysts according to the examples were measured with respect to relative oxygen binding energy by using DFT (density functional theory), assuming that 10 wt % of an acidic material in the form of a solid solution was disposed on $Al_2O_3$, and the results are shown in FIG. 6.

Referring to FIG. 6, oxygen adsorption was found in an order of Comparative Example 1 ($Pd/Al_2O_3$)>Comparative Example 2 ($Pt/Al_2O_3$)>Example 2 ($Pt/Ti—Al_2O_3$)>Example 1 ($Pt/Si—Al_2O_3$).

Accordingly, the $Pt/Si—Al_2O_3$ catalyst having the lowest oxygen adsorption is expected to decrease an oxygen coverage and thus induce surface adsorption of a hydrocarbon (HC) reactant and accordingly, improve purification performance of the hydrocarbon.

Experimental Example 2: Saturated Hydrocarbon Purification Rate of Catalyst

Figure 7:
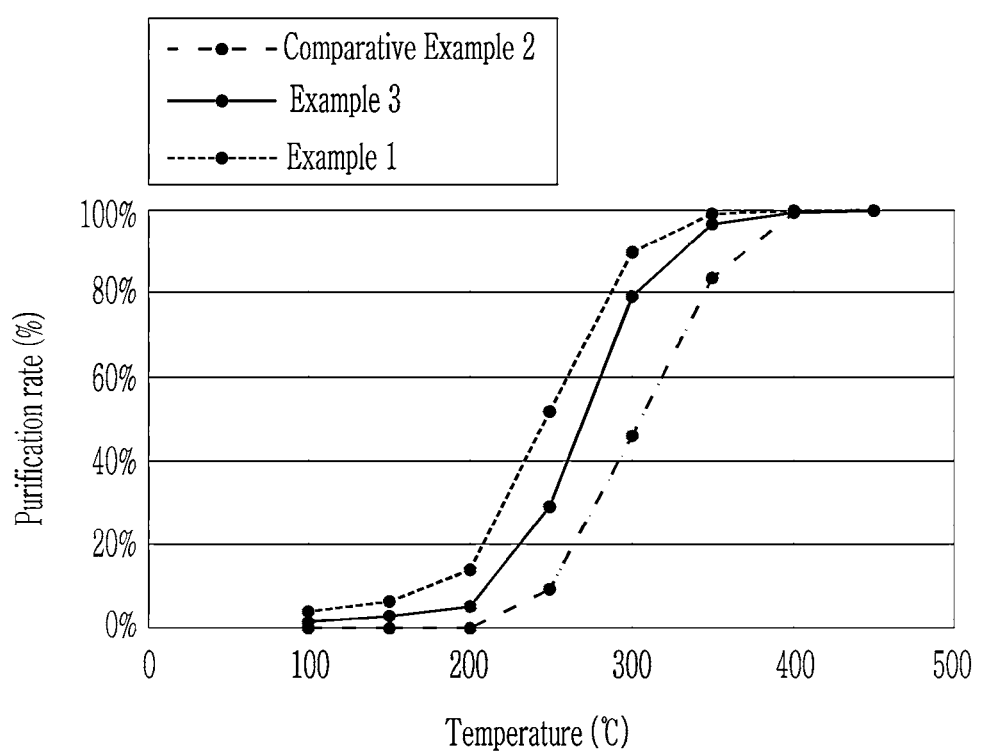
FIG. 7 is a graph showing the results of measuring the saturated hydrocarbon purification rate of catalysts prepared in examples and comparative examples.

After injecting 1200 ppm of $C_3H_8$ into the catalysts according to the examples and the comparative examples and adjusting the amounts of oxygen, carbon monoxide, hydrogen, and nitrogen oxide to maintain air-fuel ratios thereof at 1.8, saturated hydrocarbon purification rates of the catalysts were measured by using a reduced $C_3H_8$ amount relative to the initial $C_3H_8$ amount, while heated up to 450° C. under a condition of 100° C. and, and the results are shown in FIG. 7.

Referring to FIG. 7, the catalysts according to the examples, since platinum was supported on the acidic support and thus decreased a bonding force between Pt—O, had an air-fuel ratio of greater than or equal to about 1.2 and exhibited an excellent saturated hydrocarbon purification rate, even when mounted on an exhaust gas stream emitted from running gasoline engines.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope greater than or equal to appended claims.

The invention claimed is:

1. A catalyst for removing saturated hydrocarbon, consisting of:
   an acidic support including porous alumina ($Al_2O_3$) and having higher acidity than alumina; and
   an active metal including platinum (Pt) and supported on the acidic support;
   wherein the acidic support comprises an acidic material including a metal oxide having a higher acidity than alumina supported on the porous alumina;
   wherein the metal oxide having higher acidity than alumina comprises $SiO_2$ and $TiO_2$; and
   wherein the catalyst has a relative oxygen binding energy based on the oxygen binding energy of Pd(111) of less than about −0.01 eV.

2. The catalyst of claim 1, wherein the acidic material is physically mixed, chemically bonded, or coated onto the porous alumina.

3. The catalyst of claim 1, wherein the acidic support is a solid solution of the porous alumina and the acidic material.

4. The catalyst of claim 1, wherein the acidic material is in contact with or not in contact with the platinum.

5. The catalyst of claim 1, wherein the catalyst is mounted on the exhaust gas flow from gasoline engines operating with an air-fuel ratio of greater than or equal to about 1.2.

* * * * *